(12) United States Patent
Bichot et al.

(10) Patent No.: US 9,258,333 B2
(45) Date of Patent: Feb. 9, 2016

(54) METHOD FOR RECOVERING CONTENT STREAMED INTO CHUNK

(75) Inventors: Guillaume Bichot, Cesson Sevigne (FR); Stephane Gouache, Cesson Sevigne (FR)

(73) Assignee: THOMSON LICENSING, Issy les Moulineaux (FR)

(*) Notice: Subject to any disclaimer, the term of this patent is extended or adjusted under 35 U.S.C. 154(b) by 212 days.

(21) Appl. No.: 13/635,199

(22) PCT Filed: Mar. 31, 2011

(86) PCT No.: PCT/EP2011/055030
§ 371 (c)(1),
(2), (4) Date: Sep. 14, 2012

(87) PCT Pub. No.: WO2011/121083
PCT Pub. Date: Oct. 6, 2011

(65) Prior Publication Data
US 2013/0013803 A1 Jan. 10, 2013

(30) Foreign Application Priority Data
Apr. 1, 2010 (EP) .................................... 10305336

(51) Int. Cl.
*G06F 15/16* (2006.01)
*H04L 29/06* (2006.01)
(Continued)

(52) U.S. Cl.
CPC ........ *H04L 65/1046* (2013.01); *H04L 65/4084* (2013.01); *H04L 65/80* (2013.01); *H04L 67/2823* (2013.01); *H04N 19/12* (2014.11);
(Continued)

(58) Field of Classification Search
None
See application file for complete search history.

(56) References Cited

U.S. PATENT DOCUMENTS 6,496,980 B1 12/2002 Tillman et al.
6,981,045 B1 * 12/2005 Brooks .......................... 709/226
(Continued)

FOREIGN PATENT DOCUMENTS

JP 2007036666 2/2007
WO WO98/37699 8/1998
(Continued)

OTHER PUBLICATIONS

Wu-chi Feng, "On the Efficacy of Quality, Frame Rate, and Buffer Management for Video Streaming across Best-Effort Networks," Journal of High Speed Networks 11, IOS Press, 2002, pp. 199-214.*
(Continued)

*Primary Examiner* — Joseph E Avellino
*Assistant Examiner* — Phyllis A Book
(74) *Attorney, Agent, or Firm* — Tutunjian & Bitetto, P.C.

(57) ABSTRACT

The present invention concerns an adaptive streaming method, at a client device, for receiving content split into chunks corresponding to a content duration, the chunks being encoded at a server into at least a first and a second formats, the first format corresponding to a better content rendering quality level than the second format, a chunk being received during a chunk reception period. According to the invention, the method comprises the steps of measuring the available bandwidth between the client and the server for the next chunk reception period, requesting the server to send a chunk encoded at a format so that the chunk can be received during the next chunk reception period, and if some bandwidth is available for the next chunk reception period, requesting the server to send a part of a chunk encoded at a second format, the chunk having been received encoded at the first format.

4 Claims, 5 Drawing Sheets

(51) Int. Cl.
*H04L 29/08* (2006.01)
*H04N 19/30* (2014.01)
*H04N 19/12* (2014.01)
*H04N 19/156* (2014.01)
*H04N 19/164* (2014.01)
*H04N 19/89* (2014.01)

(52) U.S. Cl.
CPC .......... *H04N 19/156* (2014.11); *H04N 19/164* (2014.11); *H04N 19/30* (2014.11); *H04N 19/89* (2014.11)

(56) References Cited

U.S. PATENT DOCUMENTS

| | | | |
|---|---|---|---|
| 7,103,595 B2 * | 9/2006 | Anastasiadis et al. | |
| 7,860,996 B2 * | 12/2010 | Musayev et al. | 709/231 |
| 8,290,915 B2 * | 10/2012 | Anglin | 707/692 |
| 8,621,044 B2 * | 12/2013 | Sood et al. | 709/219 |
| 2003/0079222 A1 * | 4/2003 | Boykin et al. | 725/31 |
| 2003/0195977 A1 * | 10/2003 | Liu et al. | 709/231 |
| 2005/0262257 A1 | 11/2005 | Major et al. | |
| 2006/0242275 A1 * | 10/2006 | Shapiro | 709/220 |
| 2008/0133766 A1 * | 6/2008 | Luo | 709/231 |
| 2008/0195748 A1 * | 8/2008 | Tierney et al. | 709/232 |
| 2008/0294789 A1 | 11/2008 | Nassor et al. | |
| 2009/0067817 A1 * | 3/2009 | Chuang et al. | 386/124 |
| 2010/0138511 A1 * | 6/2010 | Guo et al. | 709/207 |

FOREIGN PATENT DOCUMENTS

| | | |
|---|---|---|
| WO | WO03/042783 | 5/2003 |
| WO | WO-2005109224 | 11/2005 |
| WO | WO-2009063467 | 5/2009 |
| WO | WO 2009063467 A2 * | 5/2009 |

OTHER PUBLICATIONS

Sanjeev etal: "Rate-distortion optimized client side rate control for adaptive media streaming", IEEE Inter'l Workshop, Oct. 5, 2009, pp. 1-6.

Zambelli: "IIS Smooth Streaming Technical Overview", Internet Citation; pp. 1-18.

Search Reports dated Sep. 13, 2010 (EPO) and Jul. 13, 2011 (Int'l).

Amon et al., "File Format for Scalable Video Coding", IEEE Transactions on Circuits and Systems for Video Technology, vol. 17, No. 9, Sep. 2007, pp. 1174-1185.

Feng, "On the efficacy of quality, frame rate, and buffer management for video streaming across best-effort networks", Journal of High Speed Networks, 11 (2002), pp. 199-214.

International Standard, "Information Technology—Generic Coding of Moving Pictures and Audio: Systems", ISO/IEC 13818-1:2000, Amendment 3, Jul. 2003. (26 pages).

International Standard, "Coding of Moving Pictures and Audio", ISO/IEC FDIS 14496-14:2003, Jan. 2003 (19 pages).

* cited by examiner

METHOD FOR RECOVERING CONTENT STREAMED INTO CHUNK

This application claims the benefit, under 35 U.S.C. §365 of International Application PCT/EP2011/055030, filed Mar. 31, 2011, which was published in accordance with PCT Article 21(2) on Oct. 6, 2011 in English and which claims the benefit of European patent application No. 10305336.9, filed Apr. 1, 2010.

FIELD OF THE INVENTION

The present invention relates generally to adaptive video streaming and in particular to a method for recovering the adaptive video streaming content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Media delivery streaming solutions are mainly based on protocols such as Real time streaming Protocol (RTSP) as defined in the IETF RFC 2326, Microsoft Media Server (MMS) proprietary protocol from Microsoft or Real Time Messaging Protocol (RTMP) proprietary protocol from Adobe Systems. More recently new streaming techniques based on HTTP protocol have emerged. Adaptive streaming technology provides a way to compensate erratic network behavior regarding available bandwidth by continuously and gracefully upgrading or downgrading the video quality in order to fit with the bandwidth constraint. More precisely, a video stream is encoded into several encoded bit streams, each corresponding to a bit rate constraint, such as for example 300 kbps, 600 kbps, 1200 kbps 2000 kbps or 3000 kbps. Each of these streams is then split into chunks, representing for example two seconds duration, all well aligned in a way that each chunk starts with a reference frame; no frame of any given chunk references a frame in another chunk. In other words, the video stream is cut into short segments called chunks and encoded to the desired delivery format. Chunks are typically 2-to-4-seconds long. At the video codec level, this typically means that each chunk is cut along video Group of Pictures (GOP) boundaries and has no dependencies on past or future chunks and GOPs. This allows each chunk to later be decoded independently of other chunks.

A client device requests a HTTP server, to send a chunk attached to a particular bit rate regarding the estimated bandwidth, where the available bandwidth can be measured e.g. by measuring the round trip time used by of an HTTP request/response. The video stream is then delivered, chunk after chunk based on client requests. This is illustrated in FIG. 1, which shows four levels of chunk bit rates, from the lower to the upper bit rate. Video chunks, all corresponding to a fixed duration, are more or less large. A large chunk requires higher bandwidth and provides better video quality. The chunk selection depends on the estimated available bandwidth that corresponds to the curve. Of course, depending on the implementation, the environment, the network technology and the client application, the strategy may be more or less conservative. When conservative, the client requests higher bit rate chunk only after a certain time, ensuring smooth upgrade transition. A less conservative strategy would be to request higher bit rate chunk as soon as the client detects that more bandwidth is available. And in general, the client requests lower bit rate chunk as soon as it detects a bandwidth decrease implying rapid downgrade transition.

Examples of such streaming techniques are the "Move Adaptive Stream" from Move Networks, the "HTTP Live Streaming" from Apple Inc. and the "IIS (Internet Information Services) Smooth Streaming" from Microsoft. The benefit of using the HTTP protocol in these streaming solutions is its capability to cross over NAT and firewall seamlessly. These HTTP streaming technologies provide a way to compensate erratic network behavior regarding available bandwidth by continuously and gracefully upgrading or downgrading the video quality in order to fit with the bandwidth constraint.

In more details, WO 2005/109224 A2 from Move Networks describes a mechanism in an Agent Controller Module hosted in the client side and able to adapt to the fluctuant network bandwidth thanks to the fact that the media to stream is previously organized in a plurality of streamlets, also called chunks, each of them being encoded from low to high bit rates. According to the available network bandwidth and some other additional information a monitoring tool incorporated in the Agent Controller Module uses the HTTP protocol to request the server to send the best suited chunk to be streamed over a TCP/IP connection. On an elementary chunk basis the quality is up-shifted or down-shifted according to the Agent Controller Module.

The IIS Smooth Streaming Technical Overview, from Alex Zambelli, Microsoft Corporation, March 2009, describes the IIS Smooth Streaming Technique based on HTTP protocol over TCP/IP connection. The media to be streamed by the Server is previously chopped into chunks representing for example one to ten seconds duration. Then these chunks are encoded according to the H.264/MPEG-4 AVC standard at different bit rates and stored within a MP4 file format container. The mechanism selecting the bit rate according to the network bandwidth fluctuation and requesting seamlessly the corresponding chunks to the server is entirely implemented in the client side through an application code, the Silverlight application. The HTTP Live Streaming supports dynamic switching between streams of different data rates in response to changing connection speeds.

Apple Inc. submitted an Internet Draft to IETF in October 2009 on an HTTP streaming method specification entitled "HTTP Live Streaming draft-pantos-http-live-streaming-02". The HTTP streaming architecture is based on 3 pillars: a Server, a Distribution, through a Web server or a Web caching system, and a Client. The media to be streamed is a video encoded in H.264 and an audio encoded in AAC. At a server, it is encapsulated in MPEG-TS containers and fragmented into chunks of equal duration with a specific tool named Apple stream segmenter. This tool generates the chunks that are saved into *.ts files and an index file *;m3u8 constituting the chunks playlist. Then a client fetches the index file first thanks to an URL pointer. The index file in turn specifies the location of the available media files, decryption keys, and any alternate streams available. For the selected stream, the client downloads each available media file in sequence.

With such adaptive streaming techniques, the video quality is irregular. A stream acquired by a client chunk after chunk does not have a consistent quality as it is a mix of different bit rate chunks. That video may be stored at the receiver to be replayed later on. Usually with such streaming applications, there is no need to resend the stream over the network as the chunks could have been recorded in a local storage facility.

However the series of recorded chunks correspond to the network conditions that were experienced during the streaming session resulting in the non consistent quality of the video.

A solution to this problem would be to reacquire from the server the chunks corresponding to the low quality chunks. This can be done as a grouped download before the recorded stream is replayed. However this may be time consuming. Another solution is to replace the low quality chunks on-the-fly during the recorded stream playback. There is no guaranty however that the client would get better quality chunks at the time they are needed either. And, both solutions oblige the client to be connected to the server.

SUMMARY OF THE INVENTION

The present invention attempts to remedy at least some of the concerns connected with the low quality chunks in the prior art, by providing methods that opportunistically enhances the chunks quality.

To this end, the invention relates to an adaptive streaming method, at a client device, for receiving content split into chunks corresponding to a content duration, the chunks being encoded at a server into at least a first and a second formats, the first format corresponding to a better content rendering quality level than the second format, a chunk being received during a chunk reception period.

According to the invention, the method comprises the steps of measuring the available bandwidth between the client and the server for the next chunk reception period, requesting the server to send a chunk encoded at a format so that the chunk can be received during the next chunk reception period, and if some bandwidth is available for the next chunk reception period, requesting the server to send a part of a chunk encoded at a second format, the chunk having been received encoded at the first format.

According to an embodiment the method comprises the steps of receiving the chunks and transmitting the chunks to a rendering device.

According to an embodiment the method comprises the step of storing the chunks in a memory.

According to an embodiment of the invention, the method comprises the step of using the available bandwidth in successive chunk reception periods for requesting the whole parts of the chunk encoded at the second format.

According to an embodiment of the invention, the method comprises the step of, on reception of the whole parts of a chunk encoded at a second format, swapping in the memory the chunk encoded at the first format with the chunk encoded at a second format.

The invention also relates to an adaptive streaming method, at a client device, for receiving content split into chunks corresponding to a content duration, the chunks being encoded at a server according to the scalable video coding, SVC, technique into a base layer and at least one enhancement layer, a chunk being received during a chunk reception period. To this end the method comprises the steps of measuring the available bandwidth between the client and the server for the next chunk reception period, requesting the server to send a chunk encoded with at least one SVC layer, so that the chunk can be received during the next chunk reception period, and if some bandwidth is available for the next chunk reception period, requesting the server to send at least one enhancement layer of a chunk that have previously been received without said at least one enhancement layer.

According to an embodiment of the invention, the method comprises the step of receiving the chunk and transmitting the chunk to a rendering device.

According to an embodiment of the invention, the method comprises the step of storing the chunks in a memory.

Another object of the invention is a computer program product comprising program code instructions for executing the steps of the method according to the invention, when that program is executed on a computer. By "computer program product", it is meant a computer program support, which may consist not only in a storing space containing the program, such as a computer memory, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 3, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

Figure 2:
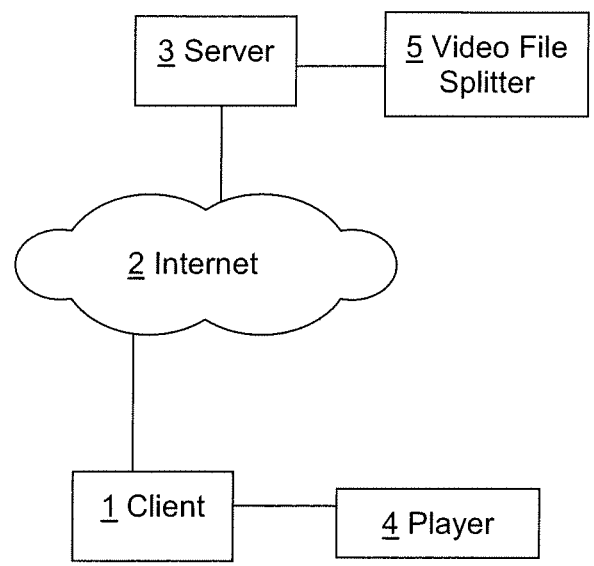
FIG. 2 is a block diagram of a system according to the embodiments.

Two embodiments are described hereinafter. In the first embodiment content is encoded in several bit rates, while in the second embodiment, content is encoded using scalable video coding. The system according to the embodiments is represented in FIG. 2. It comprises a client 1 and a server 3 connected through the Internet. The Video File Splitter 5 generates compressed video and audio into chunks. The client is also connected to a player 4. On the server side, chunks are streamed upon the client request, using HTTP protocol over a TCP/IP connection. The client requests chunks according to a method described hereinafter and based on network bandwidth estimation and notably the extra bandwidth.

Figure 3:
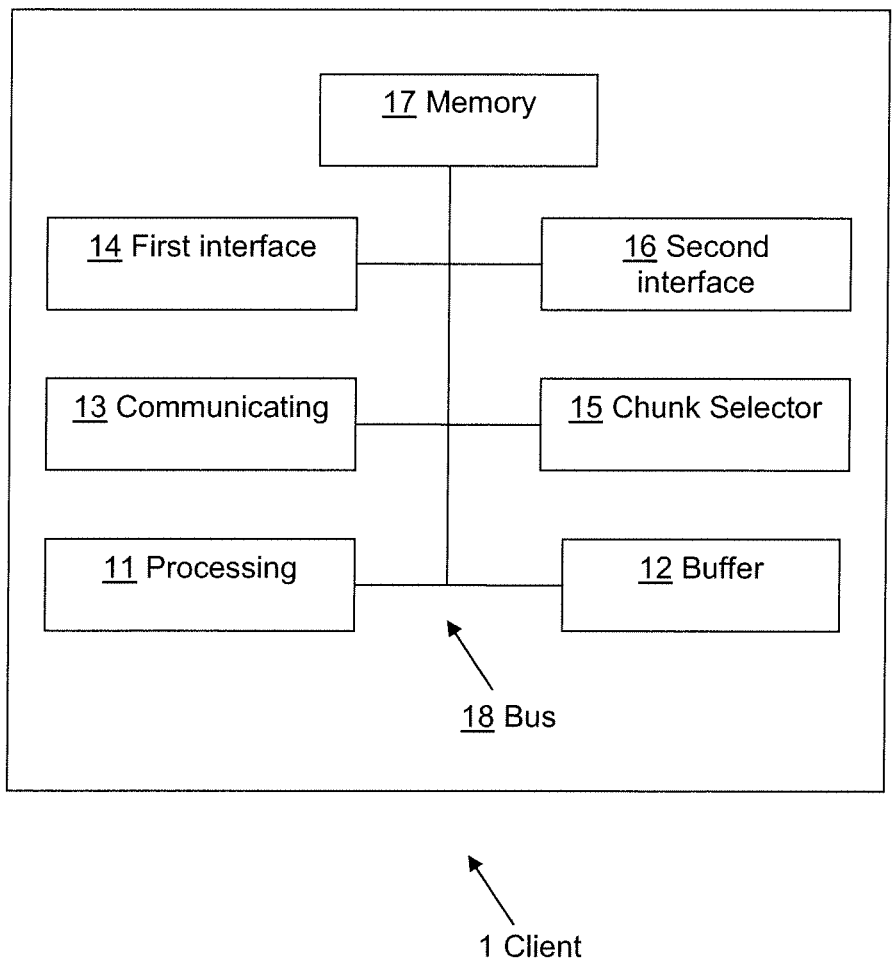
FIG. 3 is a block diagram of a client device according to the embodiments.

The client according to the embodiments is illustrated in FIG. 3. The client comprises a first interface 14 to a network and communicating means 13, which comprises the protocol stacks to communicate to a server located on the network. In particular the network is the Internet and the communicating means is the TCP/IP stack well known in the art. Of course it could be any other type of network and/or communicating means enabling a client to communicate to a server.

The client also comprises a second interface 16 to connect to a video player that is adapted to decode and render the content. Of course the second interface could enable connecting more than one player. The second interface could be an interface to a network enabling to connect one or more players. The client also comprises a processor 11 for processing the applications stored in the client. It comprises a buffer 12 for buffering the chunks received from the server before they are transmitted to the SVC player. The client also comprises a memory 17 to which the chunks received from the server are transmitted. This is preferably a non-volatile memory.

The client also comprises a non-volatile memory, not represented, for storing applications running at the client. A chunk selector 15 is an application adapted to perform the chunk selection as described hereinafter. The client could be implemented in a gateway device. Alternatively the client comprises an embedded SVC player. It could be then a device such as a set-top box.

Alternatively, the memory could alternatively be located in a storing device connected to the client device. The method as described hereinafter is then triggered only if the storing device is connected to the client. This may be triggered automatically on detection of the connected storing device. This may also be triggered on request from the end user.

The method at the client for receiving a chunk is summarized as follows:
- the chunk selector selects a chunk according to the method described herein below,
- the communicating means send a request to the server for receiving the selected chunk,
- the communicating means receive the chunk,
- the chunk is buffered,
- the chunk is sent to the video player.

According to the embodiments, the chunks are also sent to the memory 17. In order to enhance the quality of these stored chunks, the client uses the remaining available bandwidth to request higher quality chunks as indicated herein below. The higher quality chunks are then stored in the memory 17.

Figure 4:
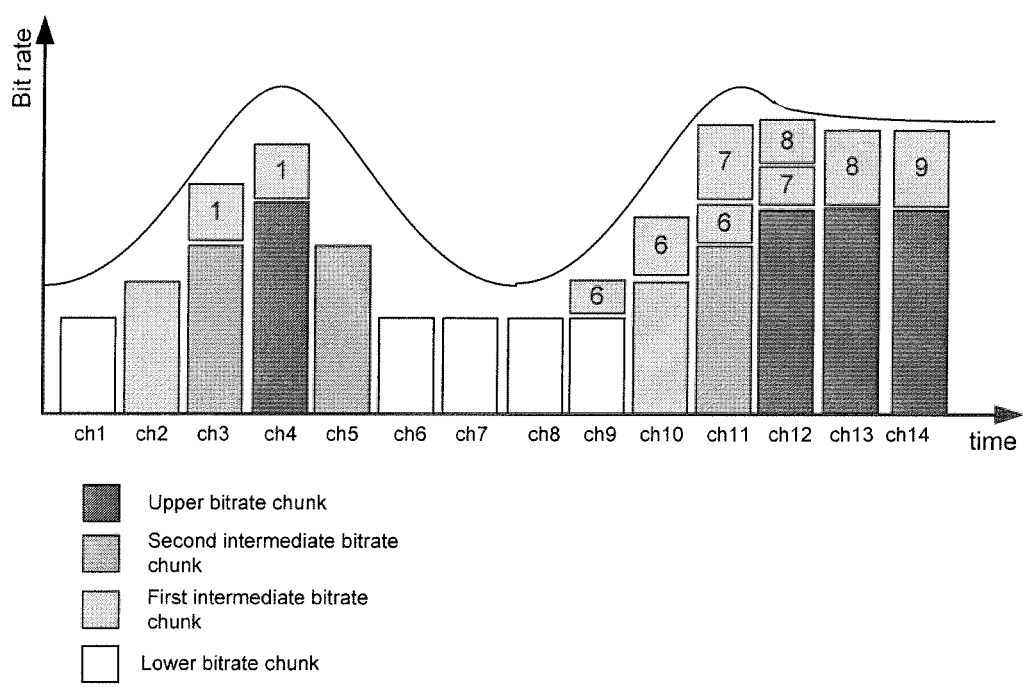
FIG. 4 illustrates a chunk delivery according to a first embodiment.

The method according to the first embodiment is illustrated in FIG. 4. A chunk duration corresponds to the video duration attached to the chunk. The client requests a chunk corresponding to a certain bit rate at every chunk duration period. The client receives chunks ch1 to ch14. Herein below the chunk duration is set to two seconds. In a conservative approach, the client requests higher bit rate chunk only after a certain time ensuring smooth upgrade transition. When the client estimates the bandwidth available for the next chunk, following a conservative approach, it requests a chunk corresponding to a bit rate that leaves sufficient bandwidth to request within the same period of time part of the chunk to be upgraded.

Figure 1:
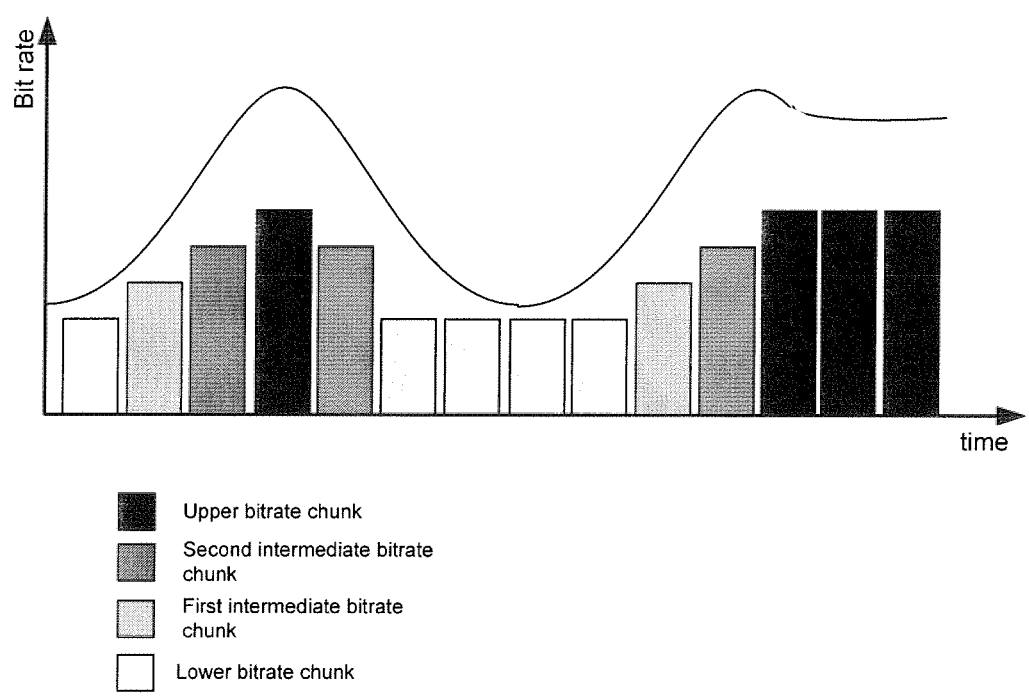
FIG. 1 is an illustration of the delivery of chunks along time.

FIG. 4 shows four levels of chunk bit rates, from the lower to the upper bit rate, as illustrated in FIG. 1. For simplicity the chunks corresponding to a same bit rate have the same size, i.e. all the chunks of a given bit rate are represented with the same acreage. As illustrated in FIG. 4, the client has requested the chunk number 3 associated with a bit rate that gives the opportunity to download simultaneously more information. The client uses the available bandwidth to request a fragment of a first intermediate bit rate version of chunk 1 which had been initially received as a low bit rate chunk, illustrated with the block having an index set to one. The same occurs when requesting the chunk 4. At this time, the client got the last fragment of the first intermediate bit rate version of chunk 1. Further, chunks 6, 7, 8 and 9 are also progressively replaced by their respective first complete intermediate bit rate versions. Of course, a chunk is replaced only when the corresponding upgraded chunk has been fully received.

Alternatively, other methods are used for upgrading the overall quality of the video locally cached in the client's host. The example shown in FIG. 4 corresponds to a method that provides an average quality enhancement wherein priority is given to upgrade lowest bit rate chunks first. Another method might prioritize the upgrade of particular chunks first as for instance chunks containing high motion sequence, where low motion sequence can be delivered in low bit rate without too much impact on quality or user experience whereas high motion sequence requires higher bit rate for a consistent quality.

In the system of the first embodiment, the Video File Splitter prepares chunks encoded according to the H.264/MPEG-4 AVC standard at different formats and stored within a MP4 file format container; each format corresponds to a bit rate that is among 300, 600, 1000 or 2000 kbps. The Video File Splitter multiplexes the chunks for producing a MPEG Transport Stream chunk series per supported bit rate. All of these chunks are stored in the HTTP server. A manifest file is sent to the client containing the list of supported bit rates, number of chunks and for each, its size.

The client can then start to request chunks delivery. The client sends one request every 2 seconds, which corresponds to the duration of the video chunk. Practically the client estimates the bandwidth and requests the chunk corresponding to the estimated bandwidth minus a conservative provision. Accordingly, the response, received from the HTTP server arrives after a certain time that is directly linked with the chunk bit rate. Once the response is received, the client computes the remaining time left before requesting the next chunk, the Time left. Then it obtains the number of bytes it can request associated to the previous chunks it wants to upgrade, the BytesMaxNum.

$$\text{Time left} = 2\ s - \text{chunk round trip time}$$

$$\text{BytesMaxNun} = \text{estimatedbandwidth (in byte/second)} * \text{time left (in second)}$$

Then, the client sends other HTTP request(s) for downloading a certain byte range from the chunk(s) to be upgraded. HTTP request format supports the demand of a certain byte range of a file. However, this requires all HTTP request/response transactions to be serialized. If an HTTP transaction is longer than estimated, this may delay the next chunk request with the risk of starving the player.

Alternatively, the client sets up a second TCP connection. The HTTP requests associated with the process of upgrading the chunks are transmitted over the second TCP connection. The client follows the same process as described herein above. The client estimates the bandwidth and requests the chunk corresponding to the estimated bandwidth minus a conservative provision through the main TCP connection. According to the provisioned estimate, the client computes the number of bytes it can request associated to the previous chunk(s) it wants to upgrade:

$$\text{BytesMaxNum} = (\text{estimatedbandwidth} - \text{chunk bit rate}) * 2\ s$$

The client may chain in parallel to the main connection, through the second TCP connection, possibly several requests asking for bytes corresponding to fragments of the chunks to be upgraded.

The client may shutdown the second TCP connection independently from the main connection. This may occur if it experiences a bandwidth reduction and wants to give priority to the main connection to maintain a smooth playback experience.

In a second embodiment of the invention, the chunks are encoded according to the Scalable Video Coding (SVC) compression technique that is standardized in H.264/MPEG-4 AVC Annex G. SVC defines three granularity parameters: temporal scalability, spatial scalability and Signal to Noise Ratio (SNR) scalability. According to criteria such as the diversity of targets or bandwidth overhead, the encoding of a stream does not necessarily require encoding in all the existing types of scalability. This conditions the number of layers for each type of scalability. For HTTP streaming, SVC content is stored in files. SVC files are formatted in either MPEG-2 Transport Streams or MP4 files. These formats allow, among others, to manage the timing information for rendering.

An MPEG2 Transport Stream is usually generated to broadcast a TV channel without any additional data. The broadcast of a TV channel with a SVC video is specified in the standard "Information Technology—Generic Coding of Moving Pictures and Audio: Systems: Transport of scalable video over ITU-T Rec. H.222.0|ISO/IEC 13818-1; Amendment 3; 03/2009". It defines a Program Map Table (PMT) for the regular TV channel C (one Elementary stream (ES) AVC and one ES audio), with an ES for each enhancement layer "I".

The MP4 file format container is specified in ISO/IEC FDIS 14496-14:2003(E) on "Information technology—Coding of Audio, Picture, Multimedia and Hypermedia Informatio—Part 14: MP4 file format". It is adapted to SVC content as specified in ISO/IEC 14496-15:2004/FDAM 2:2008(E) on "Information technology—Coding of audio-visual objects—Part 15: Advanced Video Coding (AVC) file format, AMENDMENT 2: File format support for Scalable Video Coding". The SVC file format description, illustrated by examples, can be found in the paper: "File Format for Scalable Video Coding: P. Amon; T. Rathgen; D. Singer; IEEE Transactions on circuits & Systems for video Technology, vol. 17, September 2007".

In the second embodiment, the SVC encoded video is split into chunks. A chunk doesn't only contain one SVC sample but it is a segment of a single contiguous stream, i.e. a collection of consecutive pictures. Hence a chunk has a start time, referred as "chunk offset" hereinafter, and a duration, referred as "chunk duration" hereinafter. Moreover, a chunk is aligned on a group of pictures (GOP) or an integer number of GOPs. Typically the chunk size ranges from 1 to 10 s duration. That means each chunk starts with a key frame. The content of a chunk corresponds also to only one layer of a kind of scalability. All the chunk files have the same format. Each chunk has a unique Uniform Resource Identifier (URI).

Whatever the storage format (MPEG2-TS or MP4 file), the SVC content can be either split into a file per chunk or stored as it is on the server. In the first case, the client requests for an URI while in the second one, it requests for either a timecode and a duration or a byte offset (offset from the beginning of the file) and a byte range. The available chunks are listed in a playlist generated and provided by the streaming server. This playlist can point to other playlists such as one per type of format. Playlists describe the chunk content, such as the codec or the required bandwidth, and the way to request them. The playlist format can be the one described in "HTTP Live Streaming draft-pantos-http-live-streaming-02", extended with codec information to describe the various SVC layers.

The system of the second embodiment is similar to the one of the first embodiment, but content is encoded here into SVC layers instead of being encoded into different quality levels. In particular, the Video File Splitter prepares chunks using four complementary layers; one base layer and three enhancement layers. In the first embodiment, the higher quality chunks are sent to the memory. In the second embodiment, all the chunks are sent to the memory.

Figure 5:
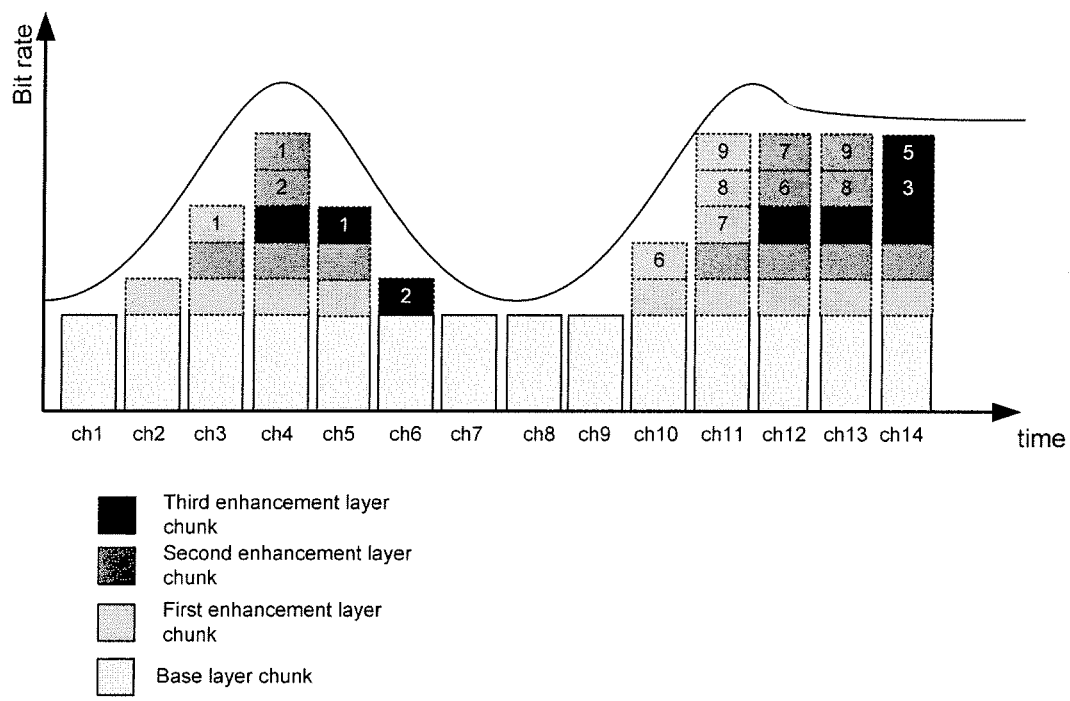
FIG. 5 illustrates a chunk delivery according to a second embodiment.

The method according to the second embodiment is illustrated in FIG. 5. The client receives chunks ch1 to ch14, represented by the base layer and enhancement layers not identified by an index. The recovered chunks are represented with an index. Here, the client has requested chunk 3 associated with a bit rate that gives the opportunity to download simultaneously more information. The client has used the available bandwidth to request the first enhancement layer piece of chunk 1 which had been initially received as a base layer chunk. The same occurs when requesting the chunk 4; the second enhancement layers of chunks 1 and 2 are requested. With chunk 5, the client requests the third enhancement layer of chunk 1. The same occurs with the chunk 6 where the third enhancement layer of chunk 2 is requested. At the time of chunk 6, the client got the entire sequence "upgraded" with enhancement layers 1 and 2, and some chunks further improved with enhancement layer 3. Further in time, chunks 3, 5, 6, 7, 8 are also upgraded. For simplicity the base layer and enhancement layers chunks are represented with a same respective size.

The second embodiment show a particular arrangement of SVC layers where the enhancement layer 1 depends on the base layer, the enhancement layer 2 depends on the enhancement layer 1 and so on. Alternatively, another SVC scheme may be used where all enhancement layers depend on the base layer. This is of course less flexible but generates less overhead.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A streaming method, at a client device, for receiving video content split into chunks corresponding to a video content duration, said chunks being encoded according to a scalable video coding, SVC, technique into a base layer and at least one enhancement layer, a chunk being received during a period of time called a chunk reception period, said method comprising, at the client device:
on reception of a first chunk from a server, rendering video content encoded into said first chunk, and storing said first chunk in a memory,
measuring the available bandwidth between the client device and the server for a next chunk reception period, requesting the server to send a second chunk encoded with at least one SVC layer, so that said second chunk can be received during said next chunk reception period according to the available bandwidth, and if said stored first chunk has been received without said at least one enhancement layer, and if further bandwidth is available at the next chunk reception period, requesting the server to send, according to the available further bandwidth, a fragment of one enhancement layer of a-said second chunk, so that said fragment can be received during said next chunk reception period, and storing said enhancement layer in said memory.

2. The method of claim 1, further comprising requesting the server to send a fragment of one enhancement layer being performed if said second chunk comprises video content corresponding to high motion sequence.

3. A client device for receiving video content split into chunks corresponding to a video content duration, said chunks being encoded according to a scalable video coding, SVC, technique into a base layer and at least one enhancement layer, a chunk being received during a period of time called a chunk reception period, said client device comprising:

a communication interface to communicate to a server, a memory and a processor for:

on reception of a first chunk from the server, rendering video content encoded into said first chunk, and storing said first chunk in the memory;

measuring the available bandwidth between the client and the server for a next chunk reception period;

requesting the server to send a second chunk encoded with at least one SVC layer, so that said second chunk can be received during said next chunk reception period according to the available bandwidth; and if said stored first chunk has been received without said at least one enhancement layer, and if further bandwidth is available at the next chunk reception period, requesting the server to send, according to the available further bandwidth, a fragment of one enhancement layer of said second chunk, so that said fragment can be received during said next chunk reception period, and storing said enhancement layer in said memory.

4. The client device of claim 3, wherein the a communication interface, the memory and the processor are further configured to request the server to send a fragment of one enhancement layer being performed if said second chunk comprises video content corresponding to high motion sequence.

* * * * *